US008924616B2

(12) United States Patent
Diab

(10) Patent No.: US 8,924,616 B2
(45) Date of Patent: Dec. 30, 2014

(54) METHOD AND SYSTEM FOR A CONNECTOR WITH INTEGRATED SHIELD DETECTION

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 804 days.

(21) Appl. No.: 12/701,381

(22) Filed: Feb. 5, 2010

(65) Prior Publication Data

US 2011/0185097 A1 Jul. 28, 2011

Related U.S. Application Data

(60) Provisional application No. 61/298,082, filed on Jan. 25, 2010.

(51) Int. Cl.
*H05K 7/10* (2006.01)
(52) U.S. Cl.
USPC .......................................... 710/301
(58) Field of Classification Search
USPC .......................................... 710/301
See application file for complete search history.

(56) References Cited

U.S. PATENT DOCUMENTS

| 5,541,840 A * | 7/1996 | Gurne et al. ................. 701/29.3 |
| 6,665,720 B1 * | 12/2003 | Willis et al. ................... 709/227 |
| 7,766,692 B2 * | 8/2010 | Johnsen et al. ............... 439/488 |
| 2002/0023245 A1 * | 2/2002 | Tokudome .................... 714/751 |
| 2006/0094286 A1 * | 5/2006 | Lee et al. ...................... 439/489 |
| 2007/0093141 A1 * | 4/2007 | Bolouri-Saransar et al. . 439/676 |
| 2008/0265915 A1 * | 10/2008 | Clark et al. ................... 324/699 |
| 2010/0283585 A1 * | 11/2010 | Anderson et al. .......... 340/10.42 |
| 2011/0115494 A1 * | 5/2011 | Taylor et al. ................. 324/537 |

* cited by examiner

*Primary Examiner* — Nimesh G Patel
(74) *Attorney, Agent, or Firm* — Brinks Gilson & Lione

(57) ABSTRACT

A connector comprising one or more circuits and/or processors is operable to determine characteristics of an attached corresponding connector, an attached cable and/or a channel established via the corresponding connector and/or cable. The characteristics are stored in a register on the connector and/or communicated via a pin connection to a host and/or upstream device. Ganged connectors may communicate via a shared pin. Sensing pins in the connector detect presence of a shield on the cable. Cable diagnostics are run on the attached corresponding connector and cable by a PHY device that may be integrated within the connector. The connector may determine characteristics such as cable length, cable grade, presence of shielding, channel characteristics and/or crosstalk on the attached corresponding connector and/or cable. Based on the determined characteristics, a data rate is determined, transmission parameters are auto-negotiated and/or data may be communicated.

20 Claims, 4 Drawing Sheets

METHOD AND SYSTEM FOR A CONNECTOR WITH INTEGRATED SHIELD DETECTION

CROSS-REFERENCE TO RELATED APPLICATIONS/INCORPORATION BY REFERENCE

This application makes reference to, claims priority to, and claims the benefit of U.S. Provisional Application Ser. No. 61/298,082, filed on Jan. 25, 2010 which is incorporated herein by reference in its entirety.

This application makes reference to:
U.S. patent application Ser. No. 61/298,076 which was filed on Jan. 25, 2010.

The above stated application is hereby incorporated herein by reference in its entirety.

FIELD OF THE INVENTION

Certain embodiments of the invention relate to wired communication systems. More specifically, certain embodiments of the invention relate to a connector with integrated shield detection.

BACKGROUND OF THE INVENTION

Communication devices may incorporate a plurality of features, for example, a mobile phone, a digital camera, an Internet browser, a gaming device, a Bluetooth headphone interface and/or a location device. The communication devices may be operable to communicate via a plurality of wire-line and/or wireless networks such as local area networks, wide area networks, wireless local area networks, cellular networks and wireless personal area networks, for example. In this regard, endpoint devices may communicate via various wireless and/or wire-line switches, routers, hubs, access points and/or base stations.

Many communication devices may communicate via twisted pair cables which may comprise pairs of copper wire that are twisted together. Various numbers of twists or turns in the wire pairs may enable mitigation of common mode electromagnetic interference. Twisted pair cabling may be shielded and/or unshielded. Shielding may comprise a conductive material that may enable grounding of the cable. A grounding wire may also be utilized for grounding twisted pair cabling. The shielding may enclose a single pair of twisted wires and/or may enclose a plurality of pairs. The shielding may comprise foil and/or a braided sheath, for example. In this regard, the shielding may mitigate cross talk between twisted pairs and/or between a plurality of cables.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a connector with integrated shield detection.

Various advantages, aspects and novel features of the present invention, as well as details of an illustrated embodiment thereof, will be more fully understood from the following description and drawings.

DETAILED DESCRIPTION OF THE INVENTION

Figure 1:
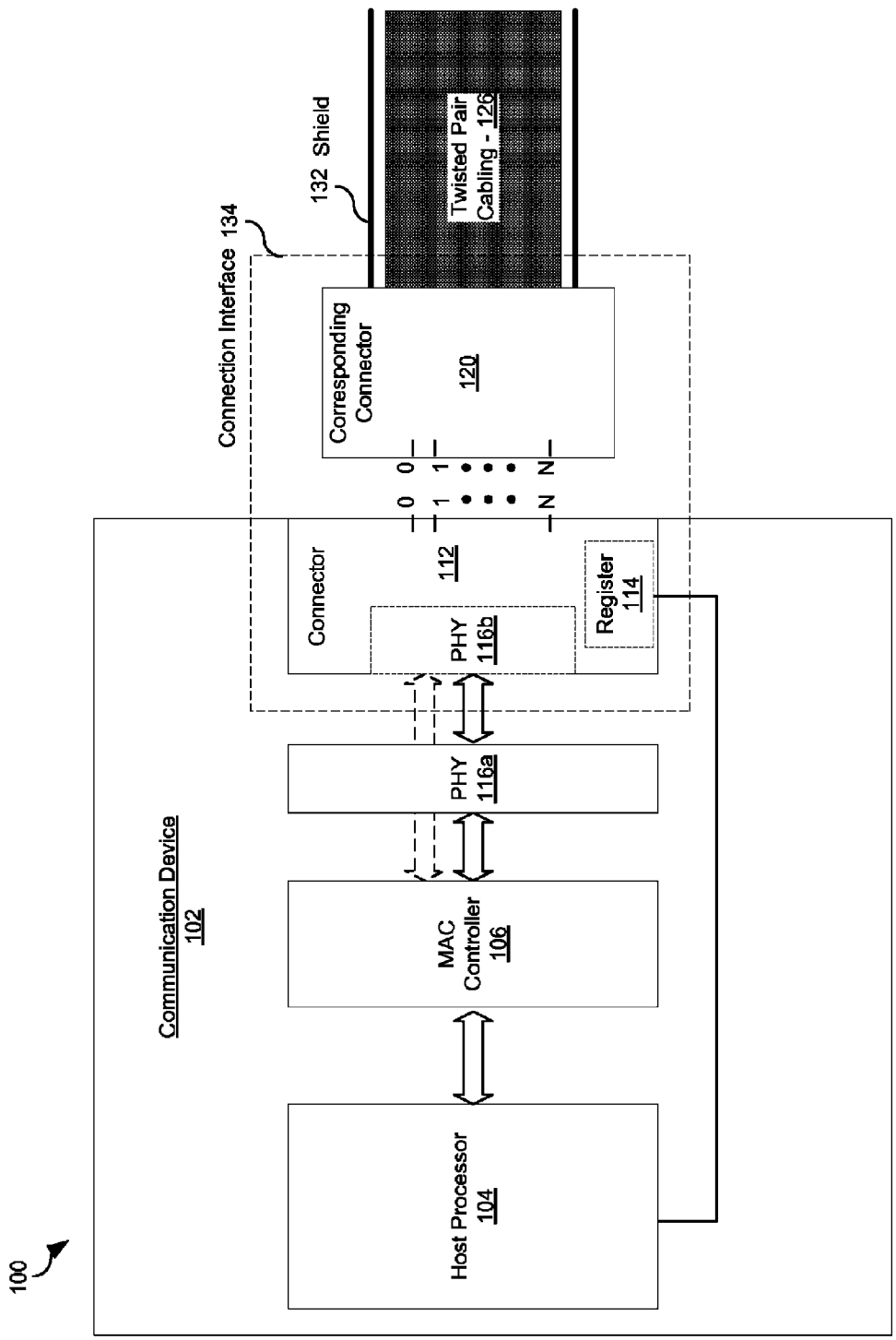
FIG. 1 is a block diagram illustrating an exemplary network device comprising a connector that is operable to detect characteristics of an attached cable, in accordance with an embodiment of the invention.

Certain embodiments of the invention can be found in a method and system for a connector with integrated shield detection. A connector may comprise one or more processors and/or circuits that may be operable to determine characteristics of an attached corresponding connector and/or an attached cable. Moreover, the connector may be operable to determine characteristics of a channel that is established when the attached corresponding connector and/or the attached cable are communicatively coupled to the connector. The characteristics of the attached corresponding connector, the attached cable and/or the established channel may be referred to as the characteristics of the attached corresponding connector, the cable and/or the channel. The one or more circuits and/or processors in the connector may be operable to communicate characteristics of the attached corresponding connector, the cable and/or the channel, to a host device and/or an upstream device. The attached corresponding connector, the cable and/or the channel characteristics may be stored in a register on the connector and/or may be communicated via a pin connection within the connector to a host and/or an upstream device, for example. In instances when a plurality of connectors are ganged together, corresponding connectors, cables and/or channel characteristics for each of the ganged connectors may be communicated to a host or upstream device via a pin connection, for example, a shared pin connection or general purpose I/O (GPIO) pin.

In various embodiments of the invention, the presence and/or the absence of a shield on the attached cable may be determined utilizing pin connections, for example, sensing pins. In other embodiments of the invention, cable diagnostics may be run on the attached corresponding connector and/or the attached cable by a PHY device that may be integrated within the connector. The one or more processors and/or circuits in the connector may comprise a PHY device. The one or more processors and/or circuits in the connector may be operable to determine one or more of type of cable, cable length, cable grade, presence and/or absence of shielding, attenuation, noise, DC characteristics, AC characteristics, thermal characteristics and/or crosstalk on said attached corresponding connector and/or said attached cable. A data rate for communicating via the connector, the attached corresponding connector and/or the attached cable may be determined based on the characteristics of the attached corresponding connector, the cable and/or the channel. Autonegotiation of transmission parameters that may be utilized for communicating via the connector, the attached corresponding connector and/or the attached cable may be determined based on characteristics of the attached corresponding connector, the cable and/or the channel. In this manner, data may be communicated via the connector, the attached corresponding connector and/or the attached cable based on characteristics of the attached corresponding connector, the cable and/or the channel. The connector and the attached corresponding connector may comprise a plug and a receptacle, respectively. The connector and the attached corresponding connector may comprise a receptacle and a plug, respectively. A receptacle may also be referred to as a socket.

FIG. 1 is a block diagram illustrating an exemplary network device comprising a connector that is operable to detect characteristics of an attached cable, in accordance with an embodiment of the invention. Referring to FIG. 1, there is shown, a communication device 102 and a connection interface 134. The communication device 102 may comprise a host 104, a MAC controller 106, a PHY device 116a and a connector 112. The connection interface 134 may comprise the connector 112, a PHY device 116b, a register 114, a corresponding connector 120, a cable 126 and an optional shield 132.

The communication device 102 may comprise suitable logic, circuitry, interfaces and/or code that may be operable to communicate with other communication devices via the connection interface 134. An exemplary communication device 102 may comprise a router, a switch, a patch panel, a laptop, a portable phone, a media player, a location device, a television, a set-top-box, a camera and/or a gaming device. The communication device 102 may be operable to communicate via the connection interface 134 based on a plurality of different standardized and/or non-standardized communication protocols and/or communication technologies, for example, based on various Ethernet protocols. The communication device 102 may or may not comprise the PHY device 116a. In various embodiments of the invention the connector 112 may comprise the PHY device 116b. In this regard, it may not be necessary for the communication device 102 to comprise the PHY device 116a. In other, embodiments of the invention, the connector 112 may not comprise the PHY device 116b and the communication device 102 may utilize the PHY device 116a for communicating via the connector 112.

The host 104 may comprise suitable logic, circuitry, interfaces and/or code that may be operable to control communication via the communication platform 134, for example, with a link partner. The host 104 may be communicatively coupled with the MAC controller 106 for communication of data and/or control information. Furthermore, the host 104 may be operable to communicate with the connection interface 134 and/or with the connector 112 to determine various characteristics and/or conditions of the connection interface 134. For example, the host 104 may determine an appropriate data rate for communicating via the corresponding connector 120, the cable 126 and/or the optional shield 132 based on one or more testing of the communication platform 134. In this regard, the host 104 may enable generation of a test voltage within the connector 112 and/or may read results from the connector to determine whether the cable 126 comprises a shield. Furthermore, the host 104 may be operable to utilize testing and diagnostics results from the optional PHY device 116b for determining a data rate for communicating via the communication platform 134.

The MAC controller 106 may comprise suitable logic, circuitry, interfaces and/or code that may be operable to handle data link layer, OSI layer 2, operability and/or functionality in the communication device 102. In various embodiments of the invention, the MAC controller 106 may be configured to implement Ethernet protocols, such as those based on the IEEE 802.3 standard, for example. The MAC controller 106 may be operable to communicate with the host 104. Depending on configuration of the communication device 102 and/or the connector 112, the MAC controller 106 may be operable to communicate with the optional PHY device 116a and/or with the optional PHY device 116b.

The optional PHY device 116a and/or the optional PHY device 116b may be operable to communicate in an upstream and/or a downstream direction at various data rates, for example, <10 Mbps, 10 Mbps, 100 Mbps, 1000 Mbps (or 1 Gbps), 10 Gbps, 40 Gbps, and/or other data rates, for example. In this regard, the optional PHY device 116a and/or the optional PHY device 116b may support standard-based data rates and/or non-standard data rates via the corresponding connector 120 and/or the cable 126. The optional PHY device 116a and/or the optional PHY device 116b may be configured to handle all the physical layer requirements, which may comprise, for example, packetization, data transfer and serialization/deserialization (SERDES), in instances where such an operation is required.

The connection interface 134 may be operable to support communication based on a plurality of standardized and/or non-standardized communication protocols and/or technologies. In various embodiments of the invention, the connection interface 134 may comprise the connector 112. In addition, the connection interface 134 may comprise the corresponding connector 120, the cable 134 and/or the optional shield 132. The connector 112 may be coupled to corresponding connectors and/or cables comprising various features. For example, various cables lengths, shielded or unshielded cables and/or various categories of cables may be coupled to the connector 112. Moreover, the communication platform 134, the connector 112, the corresponding connector 120 and/or the cable 126 may comply with one or more structured cabling standards, for example, ISO/IEC and/or TIA standards. In instances when the corresponding connector 120 and the cable 134 are coupled to the connector 112, the connector 112 may be operable to determine what type of cable and/or connector is coupled, whether the cable comprises a shield and/or may determine other factors that may be utilized to determine a rate for communicating via the coupled corresponding connector 120 and cable 126.

The connection interface 134 may comply with standardized and/or non-standard specifications. For example, the connector 112 and the corresponding connector 120 may comprise Ethernet connectors that may be small enough to fit into a handheld device and/or small enough to enable greater than 48 connectors and/or corresponding connectors to fit into a one rack unit face plate. Furthermore, in various embodiments of the invention, the connection interface 134 may comprise a plurality of connectors such as the connector 112 that may be ganged together. Moreover, in various embodiments of the invention, the connection interface 134 may be operable to support and/or utilize power over Ethernet.

The connector 112 may be operable to be coupled to the corresponding connector 120 for enabling communication. The connector 112 may be configurable or may be dedicated for a specific function. For example, the connector 112 may comprise a service port that may enable management of the communication device 102. In another exemplary embodiment of the invention, the connector 112 may be utilized for data communication. Furthermore, the connector 112 may be configurable for wireless communication, for example, the connector 112 may function as an antenna port. The connector 112 may be multifunctional where a plurality of types of communication may operate concurrently. In this regard, the corresponding connector 120 may comprise an access point and/or antenna circuitry.

In various embodiments of the invention, the connector 112 may comprise the optional PHY 116*b*. In other embodiments of the invention, the optional PHY 116*a* that may be integrated within the communication device 102 may be utilized. In instances when the optional PHY 116*b* is integrated within connector 112, the optional PHY 116*b* may be operable to perform various diagnostics on the corresponding connector 120, the cable 126 and/or the shield 132 as described with respect to FIG. 3. Furthermore, the pins in the connector 112 may be utilized for sensing and/or for testing the corresponding connector 120 and/or the cable 126. Results of the tests may be reported to the host 104, for example. U.S. Patent Application Ser. No. 61/298,076, filed on Jan. 25, 2010, which is incorporated herein by reference in its entirety, may comprise additional information regarding a connector platform comprising an integrated PHY.

Figure 2:
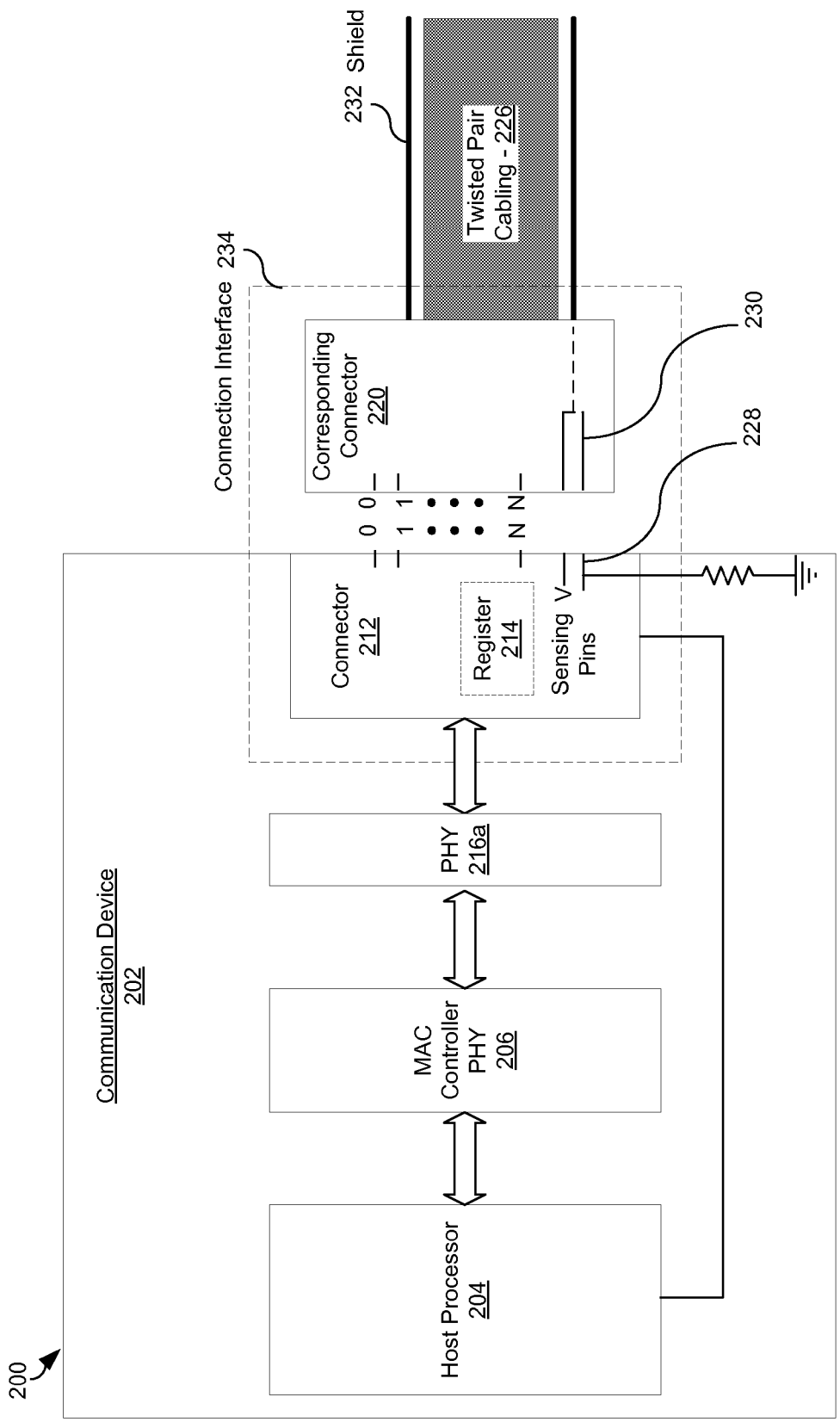
FIG. 2 is a block diagram illustrating exemplary connectors comprising sensing pins for detection of shielding in a cable, in accordance with an embodiment of the invention.
Figure 3:
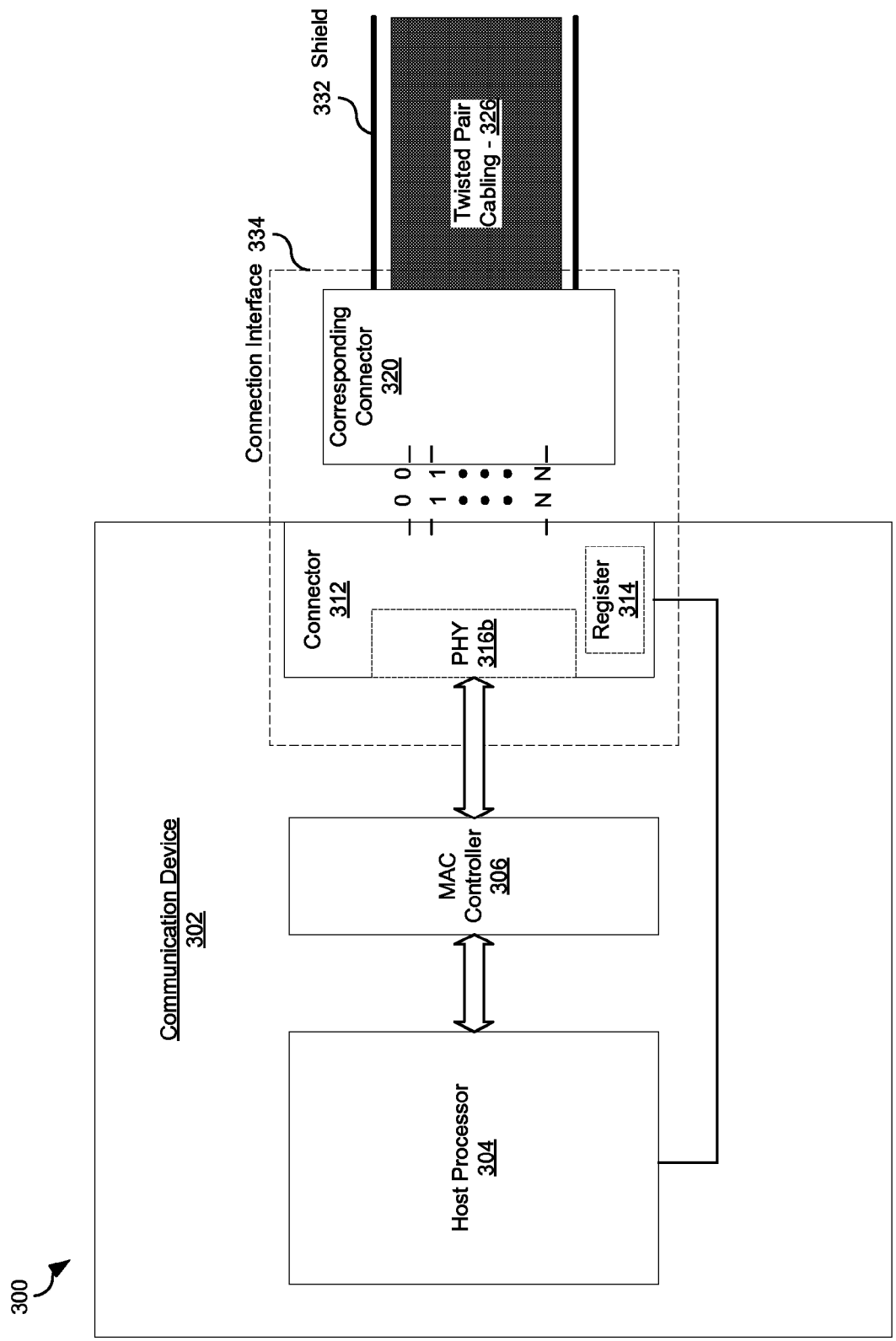
FIG. 3 is a block diagram that illustrates an exemplary connector comprising an integrated PHY for diagnosing cable characteristics, in accordance with an embodiment of the invention.

The register 114 may comprise suitable logic, circuitry, interfaces and/or code that may be operable to receive and/or store results of various tests and/or diagnostics that may be performed by the optional PHY 116*b* and/or other portions of the connector 112 such as sensing pins, described with respect to FIG. 2 and/or FIG. 3.

The corresponding connector 120 may be coupled to the cable 126 and/or the optional shield 132. The corresponding connector may be operable to connect to the connector 112 and may be utilized for communication between the communication device 102 and a link partner. In various embodiments of the invention, the corresponding connector 120 may comprise suitable logic, circuitry, interfaces and/or code that may be operable to communicate based on IEEE 802.3 standards and/or extensions and/or variations thereof.

The cable 126 may comprise a copper medium, which may comprise pairs of insulated twisted wires. The number of pairs within the cable 126 as well as other factors, such as shielding, the length of the cable and/or wire gauge may determine which protocols and/or which data rates the cable 126 may be operable to support. In various embodiments of the invention, the cable 126 may comprise the optional shield 132. The optional shield 132 may comprise, for example, foil and/or a braided sheath around and/or along a length of one or more twisted pairs. For example, one or more individual twisted pairs may be shielded and/or a plurality of twisted pairs may be shielded together by the optional shield 132. The optional shield 132 may be grounded by the communication device 102 via the connector 112, for example.

In operation, when the corresponding connector 120 may be coupled to the connector 112, the connector 112 may be operable to detect various characteristics of the connection interface 134, for example, of the corresponding connector 120, the cable 126, the optional shield 132 and/or aspects of the quality of the connection. For example, the connector 112 may be operable to determine whether the cable 126 comprises shielding, may determine how long the cable 126 may be and/or what type or grade of cable that cable 126 may comprise. Furthermore, the connector 120 may be operable to measure one or more characteristics of the quality of a channel and/or a connection that is established when the connector 112, the corresponding connector 120 and the cable 126 are coupled. For example, crosstalk, echo, attenuation, noise, DC characteristics, AC characteristics and/or thermal characteristics, may be detected and/or measured. The various characteristics of the connection interface 134 and/or the quality of the connection detected by the connector 112, may be stored within one or more registers, for example, the register 114 in the connector 112, and may be read by the host 104, for example. Moreover, the host 104 may be operable to determine appropriate data rates for communication of information based on the various aspects of the connection interface 134 and/or the aspects of the quality of the connection. In this regard, the host 104 may perform autonegotiation with a link partner that may be coupled via the corresponding connector 112 and/or the cable 126 in accordance with the determined data rates.

FIG. 2 is a block diagram illustrating exemplary connectors comprising sensing pins for detection of shielding in a cable, in accordance with an embodiment of the invention. Referring to FIG. 2, there is shown, a communication device 202 and a connection interface 234. The communication device 202 may comprise a host 204, a MAC controller 206, a PHY 216*a* and a connector 212. The connection interface 234 may comprise the connector 212, a register 214, sensing pins 228, a corresponding connector 220, a cable 226, shield sense circuit 230 and an optional shield 232.

In FIG. 2, the communication device 202, the host 204, the MAC controller 206, the PHY 216*a*, the connector 212, the connection interface 234, the register 214, the corresponding connector 220, the cable 226, and the optional shield 232 may be similar and/or substantially the same as the communication device 102, the host 104, the MAC controller 106, the PHY 116*a*, the connector 112, the connection interface 134, the register 114, the corresponding connector 120, the cable 126, and the optional shield 132 described with respect to FIG. 1.

In various embodiments of the invention, the connector 212 may comprise one or more optional processors and/or circuits that may comprise a PHY device as shown by the optional PHY 116*b* in FIG. 1.

The connector 212 may comprise the sensing pins 228 that may be operable to couple to the shield sense circuit 230 within the corresponding connector 220. The sensing pins 228 comprise, for example, GPIO pins, which may be utilized to detect the presence and/or absence of a shield in a cable that may be coupled to the connector 212. For example, when the corresponding connector 220 is coupled to the connector 212, the sensing pins 228 may close the shield sense circuit 230 and may be operable to detect whether or not the cable 226 comprises the optional shield 232. In an exemplary embodiment of the invention, the host 204 may enable generation of a small voltage at one or more of the sensing pins 228. In instances when the cable 226 may comprise the optional shield 232, the shield sense circuit 230 may be closed when the corresponding connector 220 is coupled, and may enable a sense signal to flow from one of the sensing pins 228 to another of the sensing pins 228. For example, current may be detected or voltage over a resistor and/or or a capacitor in the shield sense circuit 230 may be read. In instances when the optional shield 232 is not present, the shield sense circuit 230 may not be closed when the corresponding connector 220 is coupled to the connector 212. Although the connector in FIG. 2 comprises two sensing pins to detect the optional shield 232, the invention is not so limited. In this regard, any suitable circuit and/or pin configuration may be utilized to detect the presence of the shield. Moreover, other methods of indicating the presence of a shield, for example, mechanical keying in a connector and/or coloring of a connector or cable may be utilized. In this regard, a notch and/or extension of the mating surfaces of the connectors may enable or disable a connection that may indicate the presence of a shield. In instances when a plurality of connectors such as the connector 212, are ganged together, the ganged connectors may each have a pin and/or may share a pin for communicating the presence of shielded cable information to the host 204.

In operation, the cable 226 may comprise the optional shield 232. The corresponding connector 220 that may be coupled to the cable 226 and/or to the optional shield 232 may be connected to the connector 212. The host 204 may enable generation of a small voltage to one or more of the sensing pins 228. When the presence of the shield 232 may enable the sense circuit to close and a sense signal may flow from one of the sensing pins 228 to another of the sensing pins 228. The presence of the sense signal may set the register 214 to indicate the presence of the optional shield 232. The host 204 may be operable to read the register 214 to determine whether the coupled cable 226 comprises a shield. The host 204 may determine a data rate for communication via the corresponding connector 220 and/or the cable 226 based on the indicated presence of the optional shield 232. In addition, the host 204 may be operable to perform autonegotiation with a link partner that may be coupled to the cable 226 based on whether a shield is present in the cable 226. In various embodiments of the invention, a dedicated pin, a GPIO or a data pin in the connector 212 may be utilized for communicating control information to the host 204 from the register 214. In this regard, the control information may indicate the presence of a shield in the cable 226. In this manner, the communication device 202 may be operable to choose and/or constrain a data rate in accordance with a type of cable that is coupled. Furthermore, the host 204 may be operable to reduce energy consumption in the communication device 204 by eliminating unnecessary circuitry, for example, crosstalk cancellers, in the PHY device 216a when the cable 226 comprises the optional shield 232. In various embodiments of the invention, the data rate may be properly constrained when only one link partner has the capability to detect a shield.

FIG. 3 is a block diagram that illustrates an exemplary connector comprising an integrated PHY for diagnosing cable characteristics, in accordance with an embodiment of the invention. Referring to FIG. 3, there is shown, a communication device 302 and a connection interface 334. The communication device 302 may comprise a host 304, a MAC controller 306 and a connector 312. The connection interface 334 may comprise the connector 312, a register 314, a PHY 316b, a corresponding connector 320, a cable 326 and an optional shield 332.

Various aspects of the communication device 302 may be similar and/or substantially the same as various corresponding aspects of the communication devices 102 and/or 202 described with respect to FIG. 1 and FIG. 2. Also, various aspects of the connection interface 334 may be similar and/or substantially the same as various corresponding aspects of the connection interface 134 and/or 234 described with respect to FIG. 1 and FIG. 2. For example, the communication device 302, the host 304, the MAC controller 306, the connector 312 and the register 314 may be similar and/or substantially the same as the communication device 102 and/or 202, the host 104 and/or 204, the MAC controller 106 and/or 206, the connector 112 and/or 212 and/or the register 114 and/or 214 respectively that are described with respect to FIG. 1 and/or FIG. 2. Furthermore, the corresponding connector 320, the cable 326 and/or the optional shield 332 may be similar and/or substantially the same, as the corresponding connector 120 and/or 220, the cable 126 and/or 226, and the optional shield 132 and/or 232 respectively, that are described with respect to FIG. 1 and/or FIG. 2.

The connector 312 that may be integrated within the communication device 302 may comprise the PHY device 316b. The PHY device 316b may be similar and/or substantially the same as the PHY device 116b described with respect to FIG. 1. Furthermore, the PHY device 316b may comprise suitable logic circuitry, interfaces and/or code that may be operable to perform one or more cable diagnostic tests to determine various aspects and/or characteristics of the corresponding connector 320, the cable 326 and/or the optional shield 332. For example, the cable diagnostic tests may be operable to determine the presence of the shielding 332, to determine the length of the cable 326, to measure crosstalk and/or signal reflections and/or to determine a grade of the cable 326. Results from the cable diagnostic tests may be communicated to the host 304 via GPIO pins, for example. In this regard, the host 304 may be operable to utilize the results of the cable diagnostic tests to determine a rate for communicating data and/or control signals via the corresponding connector 320 and/or the cable 326. Moreover, the communication device 310 may utilize the results of the cable diagnostic tests when performing autonegotiation. In this regard, only one link partner may need to perform the cable diagnostic tests prior to autonegotiation. In various embodiments of the invention, the connector 312 may also comprise and/or utilize the sensing pins 228 described with respect to FIG. 2.

In operation, the cable 326 may or may not comprise the optional shield 332. The corresponding connector 320 that may be coupled to the cable 326 and/or to the optional shield 332 may be connected to the connector 312. The host 204 may enable the PHY device 316b to run one or more cable diagnostics on the corresponding connector 320, the cable 326 and/or the optional shield 332 to determine various characteristics of a communication channel supported by the corresponding connector 320 and/or the cable 326. For example, the PHY device 316b may be operable to measure and determine a level of crosstalk on the cable 326 and/or may measure a signal reflection from the cable 326 to determine cable length. A continuity test may determine whether the optional shield 332 is present. Furthermore, the PHY device 316a may be operable to determine the grade of the cable 326. Results of the cable diagnostics test may be stored in one or more registers for example, the register 314 and/or may be communicated to the host 304. The host 304 may be operable to determine a rate for communication of data via the corresponding connector 320 and/or the cable 326 based on the results of the cable diagnostics. For example, the PHY device 316b and/or the host 304 may determine that the cable 326 comprises category 5 cable. In this regard, the host 304 may negotiate a data rate of 100 Mbps during autonegotiation.

In another exemplary embodiment of the invention, the PHY device 316b and/or the host 304 may determine that the cable 326 comprises category 5E or category 6 cable. In this regard, the host 304 may negotiate a data rate of 1 Gbps. In instances when the PHY device 316b and/or the host 304 may determine that the cable 326 comprises category 6A or better cabling, the host 304 may negotiate a rate of 10 Gbps or better, for example. The communication device 302 may operate more efficiently based on knowledge of the type of a coupled cable and/or the quality of a channel established via the coupled cable. The channel quality may be determined based on signal to noise ratio (SNR), packet error rate and/or bit error rate, for example. Need for complex circuitry that may be utilized to mitigate noise, may be reduced when a high quality cable and/or good conditions are present for communication via the connection interface 334.

Figure 4:
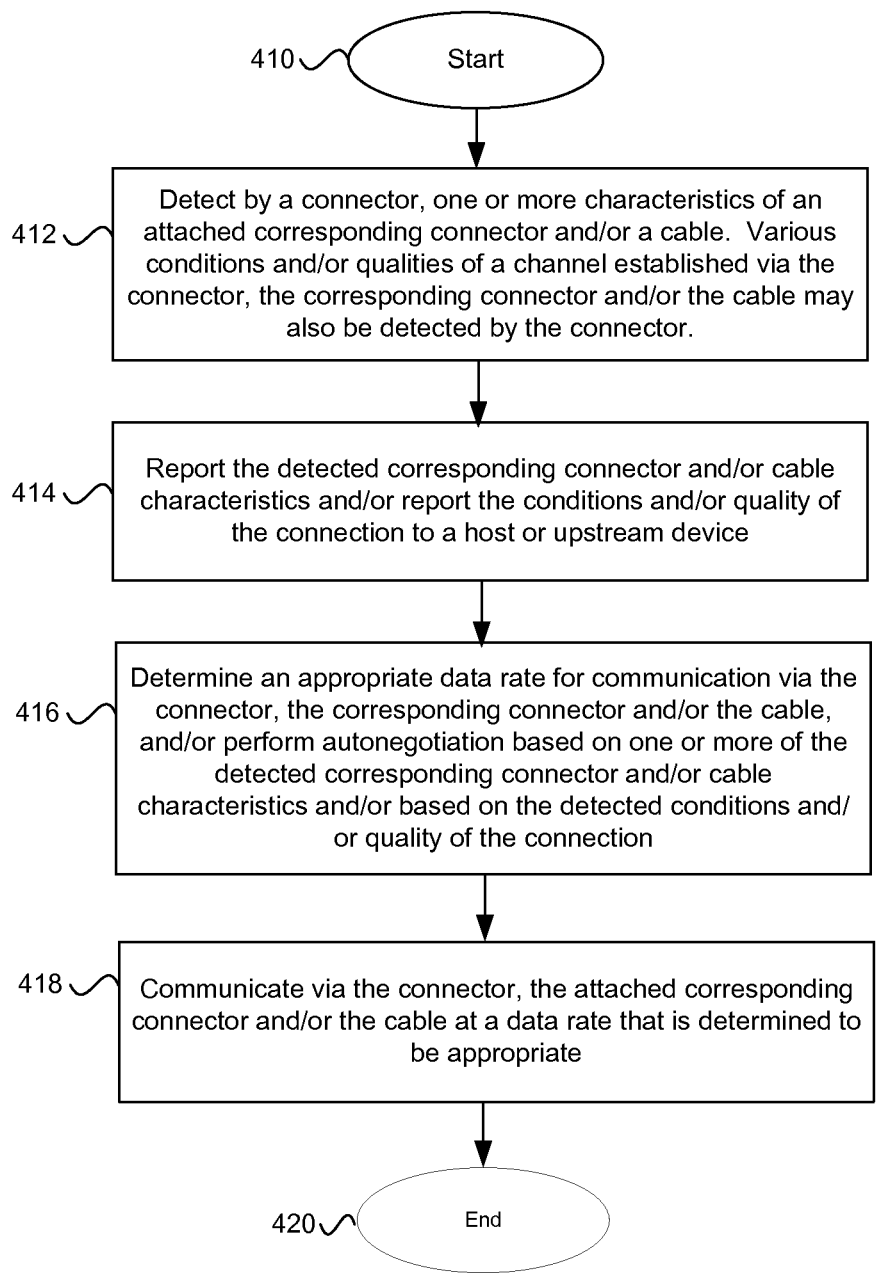
FIG. 4 is a flow chart illustrating exemplary steps for detecting cable characteristics utilizing a connector, in accordance with an embodiment of the invention.

FIG. 4 is a flow chart illustrating exemplary steps for detecting cable characteristics utilizing a connector, in accordance with an embodiment of the invention. Referring to FIG. 4, the exemplary steps may begin with step 410. In step 412, the connector 312 may determine one or more characteristics of an attached corresponding connector 320 and/or the attached cable 326. In addition, various conditions and/or qualities of the connection may be detected by the connector 312. For example, sensing pins 228 may detect presence or absence of a shield on an attached cable and/or the PHY 316*b* may be utilized to run cable diagnostics on the corresponding connector 320 and/or the cable 326. In step 414, the detected characteristics and/or the conditions and/or quality of the connection of the corresponding connector 320 and/or the cable 326 may be communicated to the host 304 and/or to an upstream device. In step 416, an appropriate data rate may be determined for communication via the connector 312, the corresponding connector 320 and/or the cable 326 and/or autonegotiation may be performed, based on one or more of the detected characteristics and/or based on the conditions and/or quality of the connection of the detected corresponding connector 320 and/or the cable 326. In step 418, data may be communicated via the connector 312, the attached corresponding connector 312 and the cable 326 at a data rate that is determined to be appropriate. The exemplary steps may end at step 420.

In an embodiment of the invention, a connector 312 comprising one or more processors and/or circuits may be operable to determine characteristics of an attached corresponding connector 320 and/or an attached cable 326. Moreover, the connector 312 may be operable to determine characteristics of a channel that is established when the attached corresponding connector 320 and/or the attached cable 326 are communicatively coupled to the connector 312. The characteristics of the attached corresponding connector 320, the attached cable 326 and/or the established channel may be referred to as the characteristics of the attached corresponding connector 320, the cable 326 and/or the established channel. The one or more processors and/or circuits in the connector 312 may also be operable to communicate characteristics of the attached corresponding connector 320, the cable 326 and/or of the channel to a host device and/or an upstream device. In this regard, the attached corresponding connector 320, the cable 326 and/or channel characteristics may be stored in a register 314 on the connector 312 and/or may be communicated via a pin connection within the connector 312 to the host 304 and/or to an upstream device, for example. In instances when a plurality of connectors such as the connector 312 are ganged together, the various attached corresponding connector, cable and/or channel characteristics for each of the ganged connectors may be communicated to a host 304 or to an upstream device via a shared pin connection and/or a general purpose I/O (GPIO) pin, for example.

In various embodiments of the invention, presence and/or absence of a shield, for example, the optional shield 332 on the attached cable 326 may be determined utilizing pin connections, for example, sensing pins 228. In other embodiments of the invention, cable diagnostics may be run on the attached corresponding connector 320 and/or the attached cable 326 by a PHY device 316*b* that may be integrated within the connector 312. The one or more processors and/or circuits in the connector may comprise a PHY device. In this regard, the one or more processors and/or circuits in the connector 312 may be operable to determine one or more of type of cable, cable length, cable grade, presence and/or absence of shielding, attenuation, noise, DC characteristics, AC characteristics, thermal characteristics and/or crosstalk on the attached corresponding connector 320 and/or said attached cable 326. A data rate for communicating via the connector 312, the attached corresponding connector 320 and/or the attached cable 326 may be determined based on the characteristics of the attached corresponding connector 320, the cable 326 and/or the channel. Autonegotiation of transmission parameters that may be utilized for communicating via the connector 312, the attached corresponding connector 320 and/or the attached cable 326 may be determined based on the attached corresponding connector 320, the cable 326 and/or the channel characteristics. In this manner, data may be communicated via the connector 312, the attached corresponding connector 320 and/or the attached cable 326 based on the characteristics of the attached corresponding connector 320, the attached cable 326 and/or the channel.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a connector with integrated shield detection.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
 performing by one or more processors or circuits in a connector:
  determining characteristics of an attached corresponding connector or a cable, by initiating and completing one or more cable diagnostic tests when said corresponding connector or said cable is attached to said connector to create a communication channel;
  detecting a presence or absence of a shield on said attached cable by sensing a sense signal flowing between pin connections; and
  configuring operation of said created communication channel based on said determined characteristics.

2. The method according to claim 1, wherein said determined characteristics comprise characteristics of said communication channel that are not established until said attached corresponding connector is communicatively coupled to said connector.

3. The method according to claim 2, wherein said one or more circuits comprise a register, said one or more circuits being operable to store in said register said determined characteristics of one or more of said attached corresponding connector, said attached cable and said channel.

4. The method according to claim 1, comprising communicating via a pin connection within said connector or within one or more ganged connectors, said characteristics of one or more of said attached corresponding connector, said attached cable and characteristics of said communication channel that are established when said corresponding connector is communicatively coupled to said connector.

5. The method according to claim 1, comprising communicating to a host or an upstream device said characteristics of said attached corresponding connector or said attached cable or characteristics of said communication channel that is established when said corresponding connector is communicatively coupled to said connector.

6. The method according to claim 1, comprising running cable diagnostics by a PHY device integrated on said connector, on said attached corresponding connector or said attached cable.

7. The method according to claim 1, wherein said determined characteristics further comprise one or more of type of cable, cable length, cable grade, presence or absence of shielding, DC characteristics, AC characteristics, or thermal characteristics on said attached corresponding connector or said attached cable.

8. The method according to claim 1, comprising determining a data rate or auto-negotiating transmission parameters for communicating via said connector, said attached corresponding connector or said attached cable based on said characteristics of said attached corresponding connector or said attached cable or characteristics of a channel that is established when said attached corresponding connector is communicatively coupled to said connector.

9. The method according to claim 1, comprising communicating data via said connector, said attached corresponding connector or said attached cable based on said characteristics of said attached corresponding connector or said attached cable or characteristics of said communication channel that is established when said corresponding connector is communicatively coupled to said connector.

10. The method according to claim 1, wherein said characteristics comprise at least one of attenuation, noise or crosstalk of said created communication channel.

11. A system for communication, the system comprising:
one or more processors or circuits within a connector, wherein said one or more processors or circuits are operable to:
determine characteristics of an attached corresponding connector or a cable, via cable diagnostic tests initiated at a time said corresponding connector or said cable is attached to said connector;
detect a presence or absence of a shield on said attached cable utilizing pin connections and a sensing signal; and
configure operation of said connector based on said determined characteristics.

12. The system according to claim 11, wherein said determined characteristics comprise characteristics of a channel that are first established when said attached corresponding connector is communicatively coupled to said connector.

13. The system according to claim 12, wherein said one or more circuits comprise a register, said one or more circuits being operable to store said determined characteristics of one or more of said attached corresponding connector, said attached cable and said determined characteristics of said channel in said register.

14. The system according to claim 11, wherein said one or more processors or circuits are operable to communicate via a pin connection within said connector or within one or more ganged connectors, said characteristics of said attached corresponding connector or said attached cable or characteristics of a channel that is established when said corresponding connector is communicatively coupled to said connector.

15. The system according to claim 11, wherein said one or more processors or circuits are operable to communicate to a host or an upstream device said characteristics of said attached corresponding connector or said attached cable or characteristics of a channel that is established when said corresponding connector is communicatively coupled to said connector.

16. The system according to claim 11, wherein said one or more processors or circuits are operable to run cable diagnostics by a PHY device integrated on said connector, on said attached corresponding connector or said attached cable.

17. The system according to claim 11, wherein said determined characteristics further comprise one or more of type of cable, cable length, cable grade, presence or absence of shielding, DC characteristics, AC characteristics, or thermal characteristics on said attached corresponding connector or said attached cable.

18. The system according to claim 11, wherein said one or more processors or circuits are operable to determine a data rate or autonegotiate transmission parameters for communication via said connector, said attached corresponding connector or said attached cable based on said characteristics of said attached corresponding connector or said attached cable or characteristics of a channel that is established when said attached corresponding connector is communicatively coupled to said connector.

19. The system according to claim 11, wherein said one or more processors or circuits are operable to communicate data via said connector, said attached corresponding connector or said attached cable based on said characteristics of said attached corresponding connector or said attached cable or characteristics of a channel that is established when said attached corresponding connector is communicatively coupled to said connector.

20. The system according to claim 11, wherein, said characteristics comprising at least one of attenuation, noise, or crosstalk.

* * * * *